Patented June 26, 1951

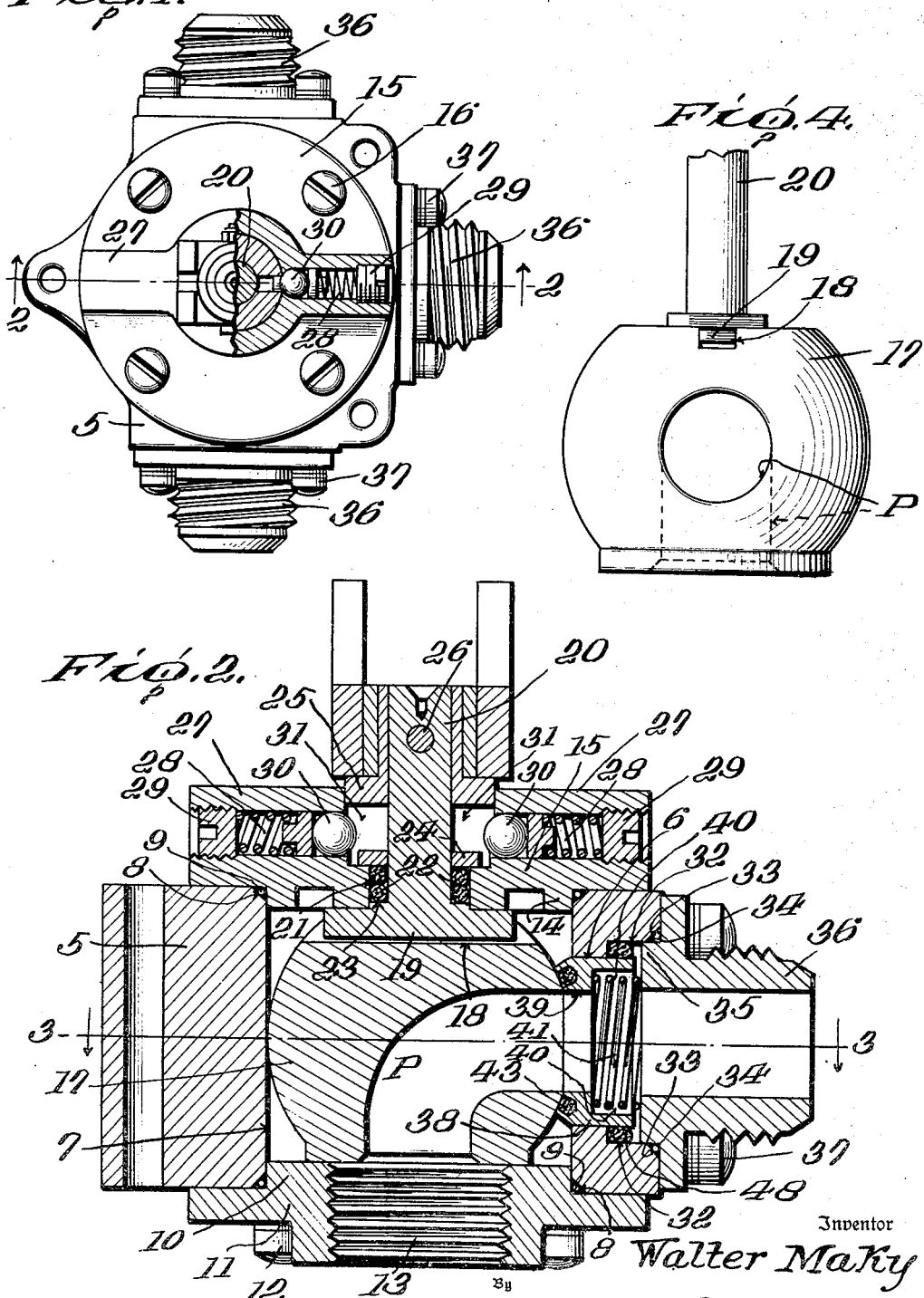

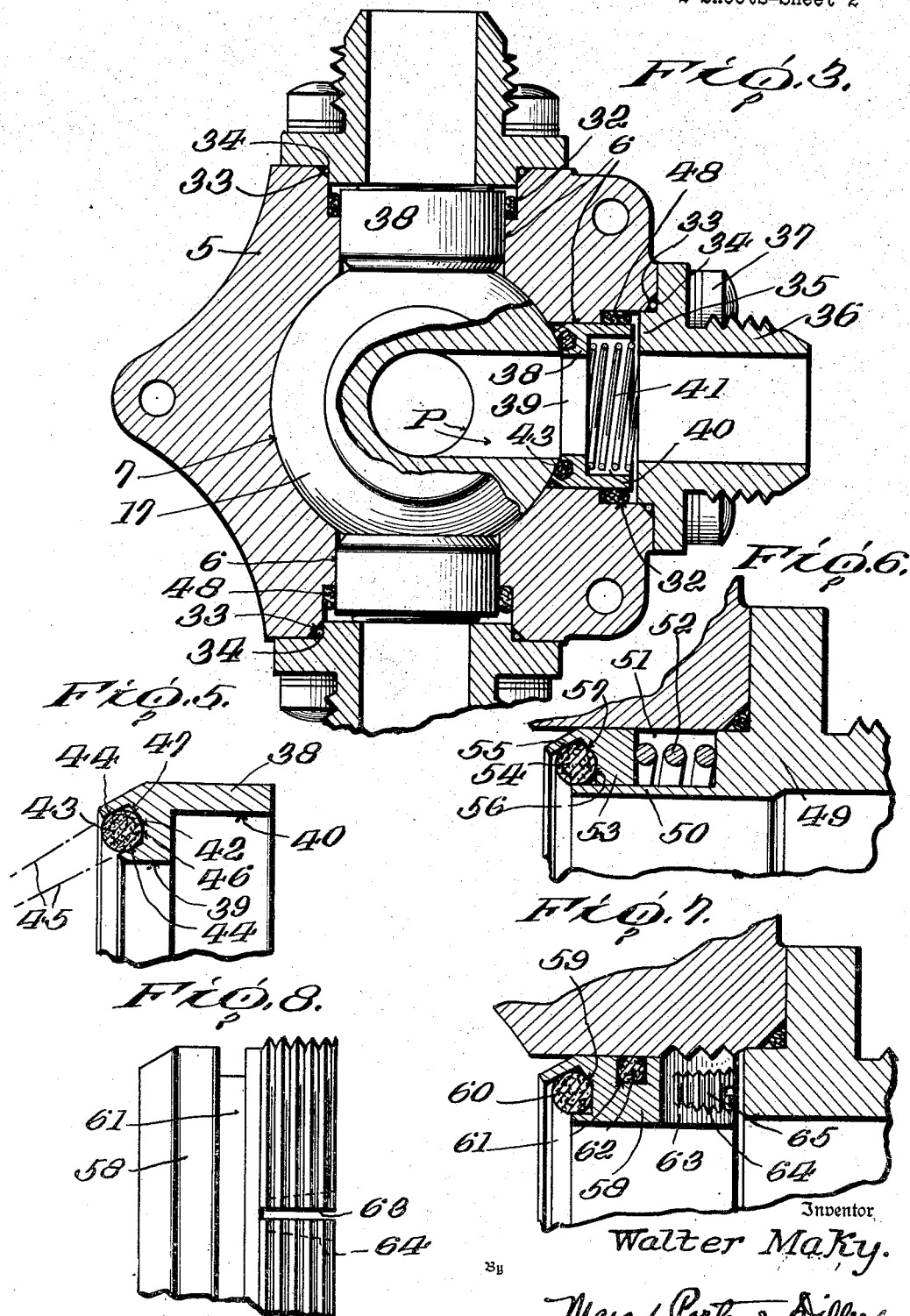

2,558,260

UNITED STATES PATENT OFFICE 2,558,260

VALVE ASSEMBLY

Walter Maky, Cleveland, Ohio, assignor to The Parker Appliance Company, Cleveland, Ohio, a corporation of Ohio Application September 5, 1944, Serial No. 552,774

3 Claims. (Cl. 251—113)

The invention relates generally to valves and primarily seeks to provide a novel valve structure embodying a casing element having at least one inlet flow passage and at least one outlet flow passage, a rotor element having a flow passage therethrough and turnable for permitting or preventing flow of fluid through selected casing and rotor flow passages, and sealing ring means carried by one said element in position for engaging between the rotor element and the casing element and about a casing element flow passage for sealing the latter off when the rotor element flow passage is turned out of communication with the casing element flow passage, said sealing ring means including spring follower means for yieldably pressing the sealing ring equipment in sealing contact against the opposed valve structure surface.

More specifically, the invention seeks to provide a valve structure of the character stated in which the rotor is spheroidal in shape and the sealing ring and spring follower means are mounted in the casing in position for presenting the sealing ring equipment for engagement with said rotor.

Another object of the invention is to provide in a valve structure of the character stated a sealing ring and follower means including a sealing ring, a follower ring backing up the sealing ring, and spring means constantly urging the follower ring against the sealing ring.

Another object of the invention is to provide a sealing ring and follower ring equipment of the character stated in which the follower ring is provided with an annular groove in which to receive the sealing ring, said groove being defined in part by wall portions which converge so as to constrict the entrance into said groove and retain the sealing ring in the groove.

Another object of the invention is to provide novel means for preventing leakage about the sealing ring and follower means.

Another object of the invention is to provide a sealing ring equipment engageable in sealing contact with a rotor and including a carrier ring grooved to receive the sealing ring, and means for adjustably mounting the carrier ring so that it can be placed and held in a definite spaced relation to the rotor.

With the above and other objects in view that will hereinafter appear, the nature of the invention will be more clearly understood by reference to the following detailed description, the appended claims, and the several views illustrated in the accompanying drawings.

In the drawings:

Figure 1 is a plan view illustrating a valve structure embodying the invention, parts being broken away and in section.

Figure 2 is a vertical cross section taken on the line 2—2 on Figure 1.

Figure 3 is a horizontal section taken on the line 3—3 on Figure 2.

Figure 4 is a detail side elevation illustrating the valve rotor.

Figure 5 is an enlarged fragmentary cross section of the follower ring and the sealing ring carried thereby.

Figure 6 is an enlarged fragmentary sectional view illustrating a modified form of carrier or follower ring and the mounting thereof.

Figure 7 is a view similar to Figure 6 illustrating another modified form of carrier ring.

Figure 8 is a fragmentary plan view of the carrier ring illustrated in Figure 7.

In the disclosure herein presented exemplifying the invention, the novel features are shown as incorporated in a valve in which the casing has three inlet or delivery ports arranged in a common horizontal plane and a single downwardly directed inlet or outlet port, and the rotor has an elbow flow passage turnable into registry with a selected one of the group of three ports for bringing about flow communication between the selected one of the three ports and the downwardly directed port, or the rotor can be turned to close off communication with all three of the horizontally disposed ports.

In the form of the invention illustrated in Figures 1 to 5 the valve structure includes a casing 5 having three radially disposed bores 6 all arranged in a common horizontal plane. Each of the bores 6 opens into a large cylindriform rotor bore 7, and each end of the rotor bore is chamfered as at 8 to provide a seat for a sealing ring 9. The sealing ring at the bottom of the valve surrounds a boss 10 extending from a closure cap 11 which is screw secured as at 12 to said casing and which holds the ring in tight sealing contact with its seat. The cap 11 is equipped with a central inlet or discharge port 13.

The sealing ring or gasket 9 at the top of the valve surrounds a boss 14 extending from a closure cap 15 which is screw secured as at 16 to the casing, and the boss 16, like the previously mentioned cap boss 14, extends into the respective end of the rotor bore 7.

A spheroidal valve rotor 17 is freely rotatably mounted in the rotor bore 7 in the manner clearly illustrated in Figures 2 and 3. The rotor is provided with a cross groove 18 in its top surface designed to receive a cross tongue 19 carried at the lower end of the rotor actuator stem 20 which passes through a center bore 21 in the cap 15 wherein it is surrounded by packing rings 22 disposed between the stem shoulder 23 and an abutment ring 24 surrounding the same in spaced relation to said shoulder.

The cap 15 also has a counterbore within which is received the collar 25 which is pin secured as at 26 upon the end of the rotor stem which extends out of the casing. The cap 15 also is equipped with a raised rib 27 having a longitudinal bore 28 therethrough in each end of which is threadably mounted an abutment screw 29 and a spring pressed ball or detent 30. Each ball or detent 30 is engageable in a recess 31 formed in the external surface of the collar 25, four such recesses being provided in equidistantly spaced relation. The spring pressed elements 30 serve to yieldably hold the rotor in selected positions or stations each disposed in ninety degree spaced relation about the rotor center. Thus the rotor will be yieldably held in the off position in which its flow passage will be out of communication with all of the casing ports, or it will be yieldably held in position for registering its flow passage with any selected one of the casing ports in the manner clearly illustrated in Figures 2 and 3 of the drawings.

Each radial bore 6 in the casing opens outwardly into a counterbore 32 which is chamfered at its outer end as at 33 to form a seat for a gasket or sealing ring 34. Each sealing ring surrounds the boss 35 of a port adaptor 36 which is screw secured to the casing as at 37 and serves to hold the respective sealing ring 34 in tight sealing contact with its seat 33.

In each radial bore 6 there is slidably mounted a carrier ring 38 having a bore 39 which is aligned with the flow passage or port in the respective port adaptor 36. Each ring 38 also includes a counterbore 40 in which is mounted a compression spring 41, said spring engaging at one end with the respective port adaptor 36 and at its other end with the follower or carrier ring 38 so as to constantly urge the ring against the sealing ring 43 of rubber or equivalent yieldable material, and said sealing ring against the periphery of the spheroidal rotor. It will be apparent by reference to Figures 2, 3 and 5 of the drawings that each sealing ring 43 is carried in a groove formed in the respective ring 38, and each said groove is defined in part by side walls 44 which converge toward the center of the rotor as indicated by dot and dash lines 45 in Figure 5, thereby to constrict the inlet into the groove in a manner for retaining the sealing ring in the groove while permitting a portion thereof to project in sealing contact with the rotor. The bottom of the groove is defined by a wall portion 46 which is normal to the axis of the carrier ring 38, and a wall portion 47 which is normal to a line drawn radially from the center of the rotor, as illustrated in Figure 5.

It will be apparent by reference to Figures 2 and 3 of the drawings that each casing counterbore 32, in addition to providing a mounting for the respective port adaptor 36, provides an annular space surrounding the outer end of the respective follower or carrier ring 38, and in each said space there is mounted a sealing ring 48 which serves to prevent leakage about the respective ring 38.

In Figure 6 there is illustrated a slightly modified form of the invention in which the port adaptor 49 is equipped with a sleeve extension 50 which extends toward the valve rotor, and which serves to provide an annular space 51 between the sleeve extension and the surrounding casing bore. In this space is mounted a compression spring 52 which engages at one end with the port adaptor and at its other end with the follower ring 53 which is slidably mounted in said spring. The inner end extremity of the sleeve extension 50 forms one wall of a groove in which the sealing ring 54 is mounted, and the other wall of said groove is formed on the follower ring 53. It will be observed that the groove forming end extremity of the sleeve extension 50 and the groove forming wall 55 of the follower ring bear a converging relation one to the other which is effective to constrict the entrance into the groove and retain the sealing ring 54 therein while permitting a portion thereof to project for sealing contact with the valve rotor. The bottom of the sealing ring receiving groove is formed in part by a ring wall portion 56 which is disposed in a plane normal to the axis of the ring, and in part by a wall portion 57 which is disposed in a plane normal to a line drawn radially from the center of the valve rotor. In this form of the invention, the casing bore in which the sealing ring means is mounted is not necessarily counterbored, and it is unnecessary to provide a separate sealing ring to prevent leakage behind the upper ring 53 since the sealing ring 54 itself forms a seal preventing such leakage.

In the modified form of the invention illustrated in Figures 7 and 8, the carrier ring 58 is threadably mounted in the respective casing bore and is provided with an annular groove 59 for receiving and retaining the sealing ring 60. It is to be understood that the form of the groove and its purpose is substantially the same as disclosed and described in the form of the invention illustrated in Figures 1 to 5. The carrier ring 58 may also be provided with a peripheral groove 61 in which is mounted a sealing ring 62 effective to engage in sealing contact with the bore in which the carrier ring is mounted and thereby seal the bore against leakage of fluid past the carrier ring 58. By reason of the threadable mounting of the carrier ring 58, said ring can be adjusted as to position toward or from the valve rotor. If desired, locking means may be provided for securing the ring 58 in positions of adjustment, and in this illustration the ring is provided with a longitudinal slit 63 which intersects a tapered and threaded socket 64 wherein is mounted a locking screw 65. From the foregoing description it will be apparent that in all forms of the invention each sealing ring engaged with the spheroidal rotor lies in a flat plane. There is a distinct advantage in having the sealing ring thus engage the spheroidal rotor surface, for in structures wherein the sealing rings engage cylindriform or coniform rotor surfaces, the sealing rings must be deformed in order to engage in sealing contact with said surfaces, with the result that the pressure contact between the sealing rings and said surfaces is not uniform.

It will be apparent by reason of the provision of the tongue and groove connection between the valve stem 20 and the valve rotor 17, that it is possible to use stems and rotors of different materials. It may be found desirable to form the rotor of graphitic material so as to reduce friction between the sealing rings and the rotor.

While the formation of the side walls of the sealing ring receiving grooves in converging relation provides advantages in the way of retaining the sealing rings within the carrier or follower ring grooves, this relation of the groove defining side walls provides additional advantages in eliminating the wedging component which would be present were said walls parallel or disposed in diverging relation, and by this means the wiping action of the rotor on the sealing rings does not tend to pinch the rings.

As has been described hereinabove, it is preferable that sealing rings initially project slightly beyond their mounting grooves so that when the sealing rings are deformed against the rotor, the carrier or follower rings closely approximate engagement with the rotor surface, thus minimizing the possibility of the sealing rings being extruded from their mounting grooves so that they can be pinched.

It will also be obvious that the provision of the spheroidal rotor makes it immaterial whether the sealing ring means should be rotated about their axes. The advantage of this feature will be obvious since in valve structures of this type embodying cylindriform or coniform rotors, such sealing ring means would have to be assembled in a certain position with respect to the rotors in order to provide the desired seal.

While certain forms of the invention have been shown for purposes of illustration, it is to be clearly understood that various changes in the details of construction and arrangement of parts may be made without departing from the spirit and scope of the invention as defined in the appended claims.

I claim:

1. In a valve assembly of the character described, a casing element having at least one inlet flow passage and at least one outlet flow passage, a spheroidal rotor element having a flow passage therein and turnable for permitting or preventing flow of fluid through selected casing and rotor flow passages, and sealing ring means carried by the casing element in position for engaging the rotor element about the casing element flow passage for sealing the latter off when the rotor element flow passage is turned out of communication therewith, said sealing ring means including a follower ring having a groove of fixed size facing said rotor, a deformable sealing ring in said groove and normally projecting slightly therefrom for sealing contact against said rotor element, said ring being of slightly less cross-sectional area than said groove so that it can be pressed completely within said groove thereby to prevent pinching of the sealing ring, and spring means bearing against said follower for yieldably pressing the sealing ring into sealing contact with said rotor.

2. In a valve assembly of the character described, a casing element having at least one inlet flow passage and at least one outlet flow passage, a spheroidal rotor element having a flow passage therein and turnable for permitting or preventing flow of fluid through selected casing and rotor flow passages, and sealing ring means carried by the casing element in position for engaging the rotor element about the casing element flow passage for sealing the latter off when the rotor element flow passage is turned out of communication therewith, said sealing ring means including a follower ring having a groove of fixed size facing said rotor, a deformable sealing ring in said groove and normally projecting slightly therefrom for sealing contact against said rotor element, said ring being of slightly less cross sectional area than said groove so that it can be pressed completely within said groove thereby to prevent pinching of the sealing ring, and said groove being defined in part by two side walls which converge so as to constrict the entrance into said groove and retain the sealing ring in the groove, and spring means bearing against said follower for yieldably pressing the sealing ring into sealing contact with said rotor.

3. In a valve assembly of the character described, a casing element having at least one inlet flow passage and at least one outlet flow passage, a spheroidal rotor element having a flow passage therein and turnable for permitting or preventing flow of fluid through selected casing and rotor flow passages, and sealing ring means carried by the casing element in position for engaging the rotor element about the casing element flow passage for sealing the latter off when the rotor element flow passage is turned out of communication therewith, said sealing ring means including a follower ring having a groove of fixed size facing said rotor, a deformable sealing ring in said groove and normally projecting slightly therefrom for sealing contact against said rotor element, said groove being defined in part by two side walls which converge so as to constrict the entrance into said groove and retain the sealing ring in the groove, spring means bearing against said follower for yieldably pressing the sealing ring into sealing contact with said rotor, and a sealing ring surrounding the spring pressed follower ring and engaging in sealing contact between said follower ring and the surrounding casing portion within which the follower ring is mounted to prevent leakage from the interior of the casing outwardly about the follower ring.

WALTER MAKY.

REFERENCES CITED

The following references are of record in the file of this patent:

UNITED STATES PATENTS

| Number | Name | Date |
|---|---|---|
| 743,511 | Huxley | Nov. 10, 1903 |
| 920,268 | Caskey | May 4, 1909 |
| 1,331,025 | Riggin | Feb. 17, 1920 |
| 1,424,094 | Gunn | July 25, 1922 |
| 1,784,381 | O'Stroske | Dec. 9, 1930 |
| 1,954,018 | Miller | Apr. 10, 1934 |
| 1,977,592 | Reure | Oct. 16, 1934 |
| 2,350,905 | Koehler | June 6, 1944 |
| 2,373,925 | Townhill | Apr. 17, 1945 |